United States Patent [19]

Cambon

[11] Patent Number: 5,326,389
[45] Date of Patent: Jul. 5, 1994

[54] ANTI-CORROSIVE PIGMENTARY COMPOSITION FOR COATINGS

[75] Inventor: Christian Cambon, Sanary, France

[73] Assignee: Etat Francais represente par le Delegue General pour l'Armement, Paris Armees, France

[21] Appl. No.: 938,148

[22] PCT Filed: Apr. 11, 1991

[86] PCT No.: PCT/FR91/00299

§ 371 Date: Dec. 14, 1992

§ 102(e) Date: Dec. 14, 1992

[87] PCT Pub. No.: WO91/16381

PCT Pub. Date: Oct. 31, 1991

[30] Foreign Application Priority Data

Apr. 12, 1990 [FR] France ............... 90 04703

[51] Int. Cl.$^5$ .............................. A04B 9/02
[52] U.S. Cl. ................ 106/14.44; 106/14.05; 106/424; 106/419; 106/429
[58] Field of Search .............. 106/14.05, 14.44, 419, 106/424, 427, 429, 462, 503

[56] References Cited

U.S. PATENT DOCUMENTS 4,871,532 10/1989 Hoogendoorn .................. 424/50
5,226,956 7/1993 Askels et al. ................ 106/14.05
5,244,738 9/1993 Seibel ........................... 428/418

FOREIGN PATENT DOCUMENTS 1529230 6/1967 France .

OTHER PUBLICATIONS

K. Konno et al, "Chemical and Electrochemical Modifications of Zinc Using Organic Compounds", *Plating and Surface Finishing,* vol. 74, No. 10, Oct. 1987, pp. 40–44.

*Primary Examiner*—Karl Group
*Assistant Examiner*—Chris Gallo
*Attorney, Agent, or Firm*—Oliff & Berridge

[57] ABSTRACT

The invention concerns an anti-corrosive pigmentary composition characterized in that contains zinc 8-hydroxy-quinolate.

10 Claims, No Drawings

ANTI-CORROSIVE PIGMENTARY COMPOSITION FOR COATINGS

DESCRIPTIVE SUMMARY

The invention concerns an anti-corrosive pigmentary composition for coating characterized in that it contains zinc 8-hydroxy-quinolate.

According to a preferred embodiment, the composition according to the invention is made of a pigment pulverulent mixture including, in combination, the percentage being expressed in relation to the total weight of the pigment mixture;

a) 0.5%–99.5% in weight of zinc 8-hydroxyquinolate,
b) 0.5%–99.5% in weight of at least one of the following compounds: zinc phosphate, iron phosphate, chromium phosphate, manganese phosphate, aluminum phosphate, aluminum oxide, calcium ferrite, zinc ferrite, magnesium ferrite, barium ferrite, iron ferrite, calcium borosilicate, barium borosilicate, calcium phosphosilicate, barium phosphosilicate, the complement consisting in pigment known in that type of application.

Application to anti-corrosive coatings, in particular for shipbuilding and protection of metal industrial works.

The present invention concerns an anti-corrosive pigmentary composition for painting coatings.

The invention applies more particularly to anti-corrosive coatings in particular for shipbuilding and protection of metal industrial works.

Paintings are the most usual means of protection against the risk of corrosion. They are generally pigment mixtures insoluble in suspension in a liquid medium, generally organic, and polymeric binders. After application on the substrate to be covered, the mixture hardens and leaves a solid film, adhering to the surface to be protected.

The most efficient pigments and the most often used on metal substrates are minimum and zinc chromate.

However, the legistlation recently brought into force in several European countries and the world over, have constrained the painting and varnish industry to replace the traditional anti-corrosive pigments, generally toxic, by products less dangerous for health and environment.

Thus anti-corrosive paintings containing more than 1% of strontium or zinc chromate must have a label indicating the risk of cancer in connection with their use.

The compositions containing heavy metals such as lead compounds, in particular minimum, are also subjected to a dissuasive legislation regarding their use.

The harmful effects of this toxicity on the environment and the expenses necessary for the protection of people in contact with these products are very important.

Much research has been carried out, in order to discover anti-corrosive pigments at the same time as efficient and as universally used as the strontium or zinc chromates, but less toxic for man and less harmful for the environment.

The use of zinc phosphates was initially proposed. It is usually admitted, and it has been shown by experience that, in spite of its interesting properties, this product is not in itself sufficient enough to achieve anti-corrosive performance at the level of that obtained with zinc chromates.

On contrary, presently, in commerce, there is a multiplication of pigmentary compositions containing zinc phosphates said to be "activated" by various organic substances or by various metal salts such as compounds with an aluminum, molybdenum, calcium base.

Unfortunately, the results achieved with anti-corrosive paintings containing the previously mentioned pigments are often disappointing as they are not long-lasting, due to the fast exhaustion of the activating agents by dissolution or decomposition.

Moreover, if some compositions are sometimes efficient in a given family of polymeric binders, this efficiency is generally lost when they are introduced in another family of polymeric binders.

In addition, many pigmentary compositions of this type often lead to a bad storage stability of the corresponding painting, by increase of viscosity and feeding-up.

The purpose of the invention is to offer anti-corrosive pigmentary compositions allowing to compensate for the above mentioned disadvantages, and particularly, presenting the following properties:

efficiency against corrosion higher or equal to that of zinc chromates, equal volume concentration, and for a similar binder, absence of toxicity and suppression of the nuisances to the environment, universal use in painting formulations in aqueous or organic medium, containing for example acrylic, vinyl binders, alkyde resins, epoxy resins, polyurethanes, chlorinated rubber, stability during long-term storage of the realized formulations The anti-corrosive pigmentary compositions according to the invention contain zinc 8-hydroxyquinolate as an agent of synergy against corrosion.

According to a preferred embodiment, at least one of the following pigments zinc phosphate, iron phosphate, chromium phosphate, manganese phosphate, aluminum phosphate, aluminum oxide, calcium ferrite, zinc ferrite, magnesium ferrite, barium ferrite, iron ferrite, calcium borosilicate, barium borosilicate, calcium phosphosilicate, barium phosphosilicate is associated to the zinc 8-hydroxyquinolate.

Preferably, the compositions according to the invention consist in a pigment pulverulent mixture including, in combination, the percentage being expressed in comparison with the total weight of the pigment mixture:

a) 0.5–99.5% by weight of zinc 8-hydroxyquinolate,
b) 0.5–99.5% by weight of at least one of the following pigments: zinc phosphate, iron phosphate, chromium phosphate, manganese phosphate, aluminum phosphate, aluminum oxide, calcium ferrite, zinc ferrite, magnesium ferrite, barium ferrite, iron ferrite, calcium borosilicate, barium bonosilicate, calcium phosphosilicate, barium phosphosilicate. The complement is made of the pigments known in that type of application.

Preferably, the percentage in weight of the component a is 5–15%, and that of the component b is 30–50%.

Advantageously, the b constituent is a zinc phosphate, for example the dihydric zinc phosphate, and preferably the zinc tetrahydric diphosphate $Zn_3(PO_4)_2, 4H_2O$.

Among the preferred compositions, the mixtures containing 5–15% in weight of zinc 8-hydroxyquinolate and 30–60% in weight of zinc tetrahydric diphosphate.

The zinc 8-hydroxyquinolate, whose formula is Zn $(C_9 H_6 O N)_2, 2H_2O$, is a known organometallic compound with a molecular weight of 389.4. It appears in the form of a yellowish green powder practically insoluble in water and in most organic solvents.

The derivatives of the zinc 8-hydroxyquinolate are used in human pharmaceuticals and veterinary products for their antiseptic properties.

The zinc 8-hydroxyquinolates, in particular those of divalent metals, are also used as fungicides in the field of agriculture.

However, the zinc 8-hydroxyquinolate is not known for its corrosion inhibiting properties and is not used in paintings and varnishes.

As regards the b component of the composition, it is selected among the phosphates, ferrites, borosilicates, phosphosilicates and oxides of some metals.

The chromates, phosphates, borates, and silicates are known as corrosion inhibitors.

The b component is preferably made of phosphates, and more particularly of zinc tetrahydric diphosphate $Zn_3 (PO_4)_2 4H_2O$. This last compound is used in the painting and varnish industry.

Surprisingly, the association of zinc 8-hydroxyquinolate, and corrosion inhibiting compounds here-above mentioned as b component, in particular metal phosphates, excites the anti-corrosive properties of each component.

Indeed, when pigmentary compositions are introduced according to the invention into painting formulations, an effect of synergy is highlighted leading to an anti-corrosive capacity,-higher or similar to that of zinc chromates in the considered formulations.

The painting formulations can be of any known type, as indicated previously.

The examples provided hereafter, on a non restrictive basis illustrate the efficiency against corrosion of paintings containing the pigmentary compositions according to the invention as well as their remarkable storage stability and their adherence, compared to anti-corrosive paintings containing zinc chromate.

In particular, formulations of anti-corrosive paintings of the same family have been carried out, one of them being based on a combination of zinc 8-hydroxyquinolate and zinc tetrahydric diphosphate, according to the invention, the others containing respectively zinc chromate and being based on other pigmentary associations available in the commerce and proposed as alternatives to the use of zinc chromates.

Among these pigmentary compositions of the commerce, those containing calcium ferrite, activated zinc phosphate, zinc and molybdenum basic phosphate, calcium borosilicate, zinc molybdeate, modified aluminum triphosphate, may be mentioned. The behaviours of these painting during some adhesive tests on metal supports have been compared.

The results obtained are shown in examples 1–5.

Example 6 concerns a reactive primary painting formulation with polyvinyl-butyral. It shows the efficiency in relation to the corrosion of a formulation according to the invention compared to a formulation containing zinc chromate.

The results obtained highlight, in the tested formulations, the superiority of the pigmentary compositions according to the invention, containing zinc 8-hydroxyquinolate.

EXAMPLE 1

A formulation of anticorrosive paint of the alkyde type (AFNOR family A class 4a) containing pigments according to the invention is prepared and compared to two test paints of a similar composition, respectively with a zinc chromate base (1) and with a calcium ferrite base (2).

The constituents of these three paint formation are shown in the hereafter table

| CONSTITUENT DESIGNATION | PARTS IN WEIGHT (INVENTION) | PARTS IN WEIGH (TEST PIECE (1)) | PARTS IN WEIGHT (TEST PIECE (2)) |
|---|---|---|---|
| PIGMENTS | | | |
| ZINC 8-HYDROXYQUINOLATE | 1.50 | — | — |
| TETRAHYDRIC ZINC PHOSPHATE | 18.00 | — | — |
| ZINC CHROMATE BASIC TYPE | — | 23.00 | — |
| CALCIUM FERRITE | — | — | 24.00 |
| TITANIA DIOXIDE (RUTILE) | 7.00 | 5.00 | 7.00 |
| YELLOW IRON OXIDE | 6.50 | — | 7.50 |
| VIOLET RED IRON OXIDE | 1.50 | 2.00 | — |
| MICRONISED TALCUM | 5.00 | 5.00 | 5.00 |
| NON ACICULAR ZINC OXIDE | 5.50 | 8.00 | — |
| RESINS AND ADDITIVES | | | |
| LONG ALKYDE RESIN in oil (70% in white spirit) | 38.00 | 40.00 | 38.00 |
| LEAD NAPHTHENATE SICCATIVE | 1.00 | 1.20 | 1.20 |
| COBALT NAPHTHENATE SICCATIVE | 0.20 | 0.20 | 0.20 |
| MANGANESE NAPHTHENATE SICCATIVE | 0.10 | 0.10 | 0.10 |
| SOLVENTS AND DILUENTS | | | |
| WHITE SPIRIT | 13.70 | 13.50 | 13.70 |
| DIPENTENE | 2.00 | 2.00 | 2.00 |
| TOTAL | 100.00 | 100.00 | 100.00 |

The physico-chemical characteristics of the anticorrosive paint formulations according to the invention and of the one with a zinc chromate base are mentioned in the hereafter table:

| FORMULATION PRINCIPAL PHYSICO-CHEMICAL CHARACTERISTICS | ALKYDE TYPE FORMULATIONS (AFNOR I CLASS 4a FAMILY) | |
|---|---|---|
| DESIGNATION | INVENTION | TEST PIECE |
| Extract in weight (%) | 72.2 | 71.8 |
| Dry extract in volume (%) | 53.2 | 52.8 |
| Pigments (% volume of the dry film) | 33.2 | 29.9 |
| Pigments (% in weight of paint) | 45.0 | 43.0 |
| Grinding fineness | 7 | 7 |
| Paint volume mass (g/cm3) | 1.33 | 1.32 |

The formulations are applied according to the invention and to the 2 mentioned test pieces in two layers on steel samples submitted to two types of surface preparation: a pickling at SA3 degree according to the Swedish standard n° SIS 05 59 00 1967 or a CST3 preparation according to the same standard (brushed rusty steel).

The total thickness of the dry film is 75–80 micrometers. The results of these tests, achieved with the paint formulation according to the invention, compared to those achieved with the two test formulations are summarized in the hereafter table.

EXAMPLE 2

An epoxyvinyl-polyamide type formulation of anticorrosive painting (AFNOR 1 class 6b 7a) containing pigments according to the invention is prepared and compared respectively to 2 test paintings containing zinc chromate (1) and an activated zinc of the commerce (2).

The components of these three painting formulations are shown in the table below.

| COMPARATIVE RESULTS REALIZED | PROTOCOLS OR REFERENCE | RESULTS Invention compared to test piece (1) | | RESULTS Invention compared to test piece (2) | |
|---|---|---|---|---|---|
| DESIGNATION | STANDARD | SA3 STEEL | CST3 STEEL | SA3 STEEL | CST3 STEEL |
| Accelerated salt spray corrosion testing (1000 hours) | Protocol DPCM 1051/CERTSM87 | (=) | ++ | + | ++ |
| Exposure to wet heat (3 weeks) | G621-P10-4 312/1 | | ++ | (=) | |
| Adherence on surface grid | AFNOR NFT 30038 | (=) | (=) | − | − |
| Resistance test to flame propagation (RPF) | G621 P10-4-412 | | (=) | | + |
| Impact test to mass drop (before salt spray) | AFNOR NFT 30030 | (=) | (=) | (=) | (=) |
| Adhesive test under high pressure water jet 180 bars | Protocol DPCM CERTSM | (=) | (=) | (=) | (=) |
| Flexibility test to 8 mm punch | G621 P10-2-11 | (=) | (=) | (=) | (=) |
| Storage stability in warehouse - 1 year (evolution of viscosity) | Periodic measurements viscosity KREBS-STORMER | (=) | (=) | (=) | |

KEY
− = behaviour slightly lower than the test piece behaviour
(=) = similar to the test piece behaviour
+ = slightly higher than the test piece behaviour
++ = much higher than the test piece behaviour

| CONSTITUENT | PARTS IN WEIGHT (INVENTION) | | PARTS IN WEIGHT (TEST PIECE (1)) | | PARTS IN WEIGHT (TEST PIECE (2)) | |
|---|---|---|---|---|---|---|
| DESIGNATION | ELEMENT A | ELEMENT B | ELEMENT A | ELEMENT B | ELEMENT A | ELEMENT B |
| PIGMENTS | | | | | | |
| ZINC 8 HYDROXY-QUINOLATE | 1.6 | — | — | — | — | — |
| TETRAHYDRIC ZINC PHOSPHATE | 18.0 | — | — | — | — | — |
| ZINC CHROMATE INSOLUBLE TYPE | — | — | 13.0 | — | — | — |
| COMMERCE ACTIVATED ZINC PHOSPHATE | — | — | — | — | 19.6 | — |
| SYNTHETIC YELLOW IRON OXIDE | 6.0 | — | 11.8 | — | 6.0 | — |
| ANTIMONY OXIDE | 4.0 | — | 6.0 | — | 4.0 | — |
| ORGANIC ORANGE | 0.3 | — | 0.4 | — | 0.3 | — |
| MICRONISED TALCUM | 4.0 | — | — | — | 4.0 | — |
| RESINS AND ADDITIVE | | | | | | |

| CONSTITUENT DESIGNATION | PARTS IN WEIGHT (INVENTION) | | PARTS IN WEIGHT (TEST PIECE (1)) | | PARTS IN WEIGHT (TEST PIECE (2)) | |
|---|---|---|---|---|---|---|
| | ELEMENT A | ELEMENT B | ELEMENT A | ELEMENT B | ELEMENT A | ELEMENT B |
| TYPE 1 SOLID EPOXY RESIN | 16.0 | — | 17.0 | — | 16.0 | — |
| HYDROLYZED POLY-VINYL ACETYL-CHLORIDE | 4.0 | — | 4.3 | — | 4.0 | — |
| COMPLEMENTARY RESINS AND TENSION ADDITIVE | 1.1 | — | 1.5 | — | 1.1 | — |
| POLYAMINOAMIDE AT 70% ES | — | 71.0 | — | 71.0 | — | 71.0 |
| SOLVENTS AND DILUENTS | | | | | | |
| KETONE SOLVENTS | 27.0 | — | 27.5 | — | 27.0 | — |
| NAPHTA SOLVENT | 18.0 | — | 18.3 | — | 18.0 | — |
| ETHOXYPROPANOL | — | 21.0 | — | 21.0 | — | 21.0 |
| BUTANOL - 1 | — | 8.0 | — | 8.0 | — | 8.0 |
| TOTAL | 100 | 100 | 99.80 | 100 | 100 | 100 |
| Analysis Element A | A: 100 g | | A: 100 g | | A: 100 g | |
| Element B | B: 16 g | | B: 17 g | | B: 16 g | |

The physico-chemical characteristics of these two anticorrosive paint formulations according to the invention and of the one with a zinc chromate base are mentioned in the hereafter table:

surface preparation according to the Swedish standard SIS 05 59 00 1967

The average total thickness of the dry film is 50–60 micrometers. The results of the tests obtained with the

| FORMULATION PRINCIPAL PHYSICO-CHEMICAL CHARACTERISTICS DESIGNATION | EPOXYVINYL-POLYAMIDE TYPE (AFNOR I FAMILY 6b 7a 1 CLASS) | |
|---|---|---|
| | INVENTION | TEST PIECE |
| Dry extract in weight (%) | 53.8 | 52.9 |
| Dry extract in volume (%) | 35.9 | 34.7 |
| Pigments (% volume of the dry film) | 30.3 | 22.5 |
| Pigments (% paint weight) | 29.2 | 26.7 |
| Volume mass (A + B) | 1.17 | 1.17 |

The formulations are applied according to the invention and to the two mentioned test pieces are applied in two layers on steel samples subjected to a SA3 type paint formulation according to the invention compared to those obtained with the test formulations are summarized in the hereafter table.

| COMPARATIVE RESULTS REALIZED DESIGNATION | PROTOCOLS OR REFERENCE STANDARDS | RESULTS Invention compared to test piece (1) | RESULTS Invention compared to test piece (2) |
|---|---|---|---|
| Accelerated salt spray corrosion (testing 1200 hours) | Protocol DPCM 5318 ET/SM of 29.06.87 | + | + |
| Resistance to flame propagation (RPF) | G621-22.261 | (=) | (=) |
| Adherence by tearing out | AFNOR NFT 30062 (angle 30°) | — | — |
| Control by adherence by double recess after exposure to salt spray (1200 h) | | (=) | (=) |
| Impact test by mass drop (before salt spray) | AFNOR NFT 30030 | (=) | (=) |
| Impact test by mass drop (after salt spray) | AFNOR NFT 30030 | (=) | (=) |
| Adherence by gridding (before salt spray) | AFNOR NFT 30038 | (=) | (=) |
| Adherence by gridding after exposure to salt spray | AFNOR NFT 30038 | (=) | + |
| Adhesive test under high pressure water jet 180 bars (before salt spray) | Protocol DPCM/ CERTSM | (=) | (=) |
| Adhesive test under high pressure water jet 180 bars (after salt spray) | Protocol DPCM CERTSM | + | + |
| Storage stability in warehouse - 1 year (evolution of viscosity) | Periodic measurements viscosity | (=) | + |

| COMPARATIVE RESULTS REALIZED DESIGNATION | PROTOCOLS OR REFERENCE STANDARDS | RESULTS Invention compared to test piece (1) | RESULTS Invention compared to test piece (2) |
|---|---|---|---|
| -continued | | | |
| | KREBS-STORMER | | |

KEY
− = behaviour slightly lower than the test piece behaviour
(=) = similar to the test piece behaviour
+ = slightly higher than the test piece behaviour
++ = much higher than the test piece behaviour

EXAMPLE 3

An anticorrosive paint formulation of the modified polyurethane type (AFNOR family I 7a 1-6a) containing pigmentes according to the invention is prepared and compared to 2 test paints with a similar composition, respectively with a zinc chromate base (1) and a zinc and molybdenum basic phosphate (2). The constituents of these 3 paint formulations are shown in the hereafter table tion and of those with zinc chromate base are mentioned in the hereafter table:

| FORMULATION PRINCIPAL PHYSICO-CHEMICAL CHARACTERISTICS | MODIFIED POLYRETHANE TYPE (FAMILY AFNOR I CLASS 7a1-6a) | |
|---|---|---|
| DESIGNATION | INVENTION | TEST PIECE |
| Dry extract in weight (%) | 50.56 | 50.00 |
| Dry extract in volume (%) | about 30 | about 29 |
| Pigments (% dry film volume) | about 31 | about 31 |

The formulations according to the invention and the two mentioned test pieces are applied in two layers on steel samples subjected to a SA3 type surface preparation according to the Swedish standard SIS 05 59 00 - 1967.

The average total thickness of the dry film is 150 micrometers. The results of the tests obtained with the paint formulation according to the invention compared to those obtained with the test formulations are summarized in the following table.

| CONSTITUENT DESIGNATION | PARTS IN WEIGHT (INVENTION) | | PARTS IN WEIGHT (TEST PIECE (1)) | | PARTS IN WEIGHT (TEST PIECE (2)) | |
|---|---|---|---|---|---|---|
| PIGMENTS | ELEMENT A | ELEMENT B | ELEMENT A | ELEMENT B | ELEMENT A | ELEMENT B |
| ZINC 8-HYDROXY-QUINOLATE | 1.9 | — | — | — | — | — |
| TETRAHYDRIC ZINC PHOSPHATE | 7.7 | — | — | — | — | — |
| ZINC CHROMATE INSOLUBLE | — | — | 11.7 | | | |
| ZINC AND MOLYBDENUM BASIC PHOSPHATE | — | — | — | — | 12.95 | — |
| ANTIMONY TRIOXIDE | 10.0 | — | 10.1 | — | 10.00 | — |
| SYNTHETIC BLACK IRON OXIDE | 4.0 | | 0.5 | | 4.00 | |
| MICRONISED TALCUM | 3.0 | | 3.7 | | 3.00 | — |
| ORGANIC GREEN | 0.3 | — | 1.5 | — | 0.3 | — |
| RESINS AND ADDITIVES | A | B | A | B | A | B |
| SOLID POLYALCOHOL 3% OH | 7.0 | | 7.0 | | 7.00 | |
| HYDROLYZED POLYVINYL ACETYL-CHLORIDE | 12.0 | | 12.0 | | 12.00 | — |
| THIXOTROPING AGENT | 0.5 | | 0.5 | | 0.50 | |
| TRIARYLPHOSPHATE | 2.4 | | 2.4 | | 2.40 | — |
| SOJA LECITHIN | 0.1 | | 0.1 | | 0.10 | — |
| DESMODUR L67 | — | 50.0 | — | 50.0 | — | 50.00 |
| SOLVENTS AND DILUENTS | A | B | A | B | A | B |
| METHYLISOBUTYL-KETONE | 40.5 | — | 34.0 | — | 40.50 | — |
| XYLENE | 9.5 | — | 16.0 | — | 9.50 | — |
| ANYDROUS TOLUENE | — | 50.0 | — | 50.0 | — | 50.00 |
| TOTAL | 98.9 | 100.0 | 100.0 | 100.0 | 102.25 | 100.0 |
| CORRESPONDING WEIGHT ANALYSIS | ELEMENT A: 100 g ELEMENT B: 3 g | | ELEMENT A: 100 g ELEMENT B: 3.4 g | | ELEMENT A: 100 g ELEMENT B: 3.5 g | |

The physico-chemical characteristics of these two anticorrosive paint formulations according to the invention

| COMPARATIVE RESULTS REALIZED DESIGNATION | PROTOCOLS OR REFERENCE STANDARDS | RESULTS Invention compared to test piece (1) | RESULTS Invention compared to test piece (2) |
| --- | --- | --- | --- |
| Accelerated salt spray corrosion testing (1500 hours) | Protocol DPCM n° 1051/CERTSM/87 | + | (=) |
| Exposure to wet heat | G621-P10-4 312/1 | (=) | (=) |
| Adherence by grid before exposure to salt spray | AFNOR NFT 30038 | (=) | (=) |
| Adherence by grid after exposure to salt spray | AFNOR NFT 30038 | (=) | (=) |
| Impact test by mass drop (before salt spray) | AFNOR NFT 30030 | (=) | (=) |
| Impact test by mass drop (after salt spray) | AFNOR NFT 30030 | (=) | (=) |
| Tear out adhesive test (before salt spray) | AFNOR NFT 30062 | + | + |
| Tear out adhesive test (after salt spray) | AFNOR NFT 30062 | ++ | ++ |
| Adhesive test under high pressure water jet 180 bars (before salt spray) | Protocol DPCM/ CERTSM | ++ | ++ |
| Adhesive test under high pressure water jet 180 bars (after salt spray) | Protocol DPCM/ CERTSM | ++ | ++ |
| Storage stability in warehouse - 1 year (evolution of viscosity) | Periodic measurements viscosity KREBS STORMER | + | (=) |
| Exposure test to sea spray (1 year) | G621-P10-4.212 Panel of exposure to sea spray located on the mole of PIPAOY (Toulon harbour) | (=) | + |

KEY
− = behaviour slightly lower than the test piece behaviour
(=) = similar to the test piece behaviour
+ = slightly higher than the test piece behaviour
++ = much higher than the test piece behaviour

EXAMPLE 4

A formulation of anticorrosive paint of the vinylic type (AFNOR family I, class 7a 1) containing pigments according to the invention has been prepared and it is compared to 5 test paints with a similar composition, respectively with a zinc chromate base (1), a commerce calcium borosilicate base (2), a zinc molybdate base (3), a zinc and molybdenum basic phosphate (4) and a commerce modified aluminum triphosphate base (5).

The constituents f the 6 paint formulations are shown int he hereafter table.

| CONSTITUENT DESIGNATION TEST | PARTS IN WEIGHT INVENTION | PARTS IN WEIGHT TEST PIECE (1) | PARTS IN WEIGHT TEST PIECE (2) | PARTS IN WEIGHT TEST PIECE (3) | PARTS IN WEIGHT TEST PIECE (4) | PARTS IN WEIGHT PIECE (5) |
| --- | --- | --- | --- | --- | --- | --- |
| PIGMENTS | | | | | | |
| ZINC 8-HYDROXYQUINOLATE | 1.9 | — | — | — | — | — |
| TETRAHYDRIC ZINC PHOSPHATE | 7.4 | — | — | — | — | — |
| ZINC CHROMATE INSOLUBLE TYPE | — | 9.0 | — | — | — | — |
| CALCIUM BOROSILICATE | — | — | 8.74 | — | — | — |
| ZINC MOLYBDENATE | — | — | — | 17.0 | — | — |
| ZINC AND MOLYBDENUM BASIC PHOSPHATE | — | — | — | — | 12.43 | — |
| MODIFIED ALUMINIUM TRIPHOSPHATE | — | — | — | — | — | 10.42 |
| MICRONISED TALCUM | 2.0 | 5.5 | 2.00 | 2.0 | 2.0 | 2.0 |
| CARBON BLACK | 0.2 | 0.2 | 0.2 | 0.2 | 0.2 | 0.2 |
| SYNTHETIC YELLOW IRON OXIDE | 2.0 | — | 2.00 | 2.0 | 2.0 | 2.0 |
| RESINS AND ADDITIVES | | | | | | |
| HYDROLIZED POLYVINYL ACETYLCHLORIDE | 16.0 | 16.0 | 16.0 | 16.0 | 16.0 | 16.0 |
| TRIARYLPHOSPHATE | 1.5 | 1.5 | 1.5 | 1.5 | 1.5 | 1.5 |
| ANTISEDIMENTATION AGENT | 0.5 | 0.5 | 0.5 | 0.5 | 0.5 | 0.5 |
| SOLVENTS AND DILUENTS | | | | | | |
| METHYL ISOBUTYLKETONE | 48.3 | 43.0 | 48.3 | 48.0 | 48.3 | 48.3 |
| TOLUENE | 9.5 | 24.3 | 9.5 | 9.5 | 9.5 | 9.5 |

| CONSTITUENT DESIGNATION TEST | PARTS IN WEIGHT INVENTION | PARTS IN WEIGHT TEST PIECE (1) | PARTS IN WEIGHT TEST PIECE (2) | PARTS IN WEIGHT TEST PIECE (3) | PARTS IN WEIGHT TEST PIECE (4) | PARTS IN WEIGHT PIECE (5) |
|---|---|---|---|---|---|---|
| XYLENE | 9.5 | — | 9.5 | 9.5 | 9.5 | 9.5 |
| TOTAL | 98.8 | 100.0 | 98.24 | 106.5 | 101.93 | 99.92 |

The physico-chemical characteristics of the anticorrosive paint formulations according to the invention and that with a zinc chromate base are mentioned in the hereafter table.

The total average thickness of the dry film is 85 micrometers. The results of the tests obtained with the paint formulation according to the invention compared to those obtained with the tests formulations are summarized in the hereafter table.

| FORMULATION PRINCIPAL PHYSICO-CHEMICAL CHARACTERISTICS DESIGNATION | VINYLIC TYPE FORMULATIONS (AFNOR FAMILY I CLASS 7-a1) | |
|---|---|---|
| | INVENTION | TEST PIECE |
| Dry extract in weight (%) | 31.9 | 32.6 |
| Dry extract in volume (%) | 18.3 | 18.0 |
| Pigments (% dry film volume) | 26.8 | 26.3 |
| Pigments (% paint weight) | 13.7 | 14.7 |
| Paint volume mass (g/cm3) | 0.98 | 1.01 |
| Grinding fineness | 7 | 7 |

The formulations according to the invention and the 5 mentioned test pieces are applied in two layers on steel samples subjected to a SA3 type surface preparation according to Swedish standard SIS 05 59 00 - 1967.

| COMPARATIVE RESULTS REALIZED DESIGNATION | PROTOCOLS OR REFERENCE STANDARDS | RESULTS Invention compared to test piece (1) | RESULTS Invention compared to test piece (2) | RESULTS Invention compared to test piece (3) | RESULTS Invention compared to test piece (4) | RESULTS Invention compared to test piece (5) |
|---|---|---|---|---|---|---|
| Salt spray accelerated corrosion test (1160 hours) | Protocol DPCM n° 1051/CERTSM/87 | ++ | ++ | + | ++ | ++ |
| Exposure to wet heat - 6 weeks | G621-P10-4 312/1 | + | + | − | + | + |
| Adherence by grid before exposure to salt spray | AFNOR NFT 30038 | (=) | (=) | (=) | (=) | (=) |
| Adherence by grid after exposure to salt spray 1160 hours | AFNOR NFT 30038 | (=) | ++ | (=) | + | ++ |
| Impact test by mass drop, before salt spray | AFNOR NFT 30030 | (=) | (=) | (=) | (=) | (=) |
| Impact test by mass drop, after salt spray | AFNOR NFT 30030 | (=) | (=) | (=) | (=) | (=) |
| Tear out adhesive test (before salt spray) | AFNOR NFT 30062 | ++ | (=) | + | + | ++ |
| Tear out adhesive test (after salt spray) | AFNOR NFT 30062 | ++ | ++ | + | ++ | ++ |
| Adhesive test under high pressure water jet 180 bars (before salt spray) | Protocol DPCM CERTSM | − | (=) | (=) | − | + |
| Adhesive test under high pressure water jet 180 bars (after salt spray) | Protocol DPCM CERTSM | + | ++ | (=) | ++ | ++ |
| Storage stability in warehouse - 1 year (evolution of viscosity) | Periodic measurements viscosity KREBS-STORMER | − | − | (=) | − | − |
| Sea spray exposure test (1 year) | G621-P10-212 Panel of exposure to sea spray located on the mole of PIPAOY Toulon harbour | + | − | ++ | ++ | + |

KEY
− = behaviour slightly lower than the test piece behaviour
(=) = similar to the test piece behaviour
+ = slightly higher than the test piece behaviour
++ = much higher than the test piece behaviour

EXAMPLE 5

A chlorinated rubber type paint formulation (AFNOR family 1 class 8a) containing pigments according to the invention is prepared and compared to 5 test paints with a similar composition, respectively with a zinc chromate base (1), a calcium borosilicate base (2), a zinc molybdate base (3), a modified aluminum triphosphate base (4), and a zinc and molybdenum basic phosphate base (5).

The constituents of the 6 paint formulations are shown int he hereafter table.

The physico-chemical characteristics of the anticorrosive paint formulations according to the invention and to that with a zinc chromate base are mentioned in the hereafter table.

| FORMULATION PRINCIPAL PHYSICO-CHEMICAL CHARACTERISTICS DESIGNATION | CHLORINATED RUBBER TYPE (AFNOR FAMILY 1 CLASS 8a) | |
|---|---|---|
| | INVENTION | TEST PIECE |
| Dry extract in weight (%) | 54.5 | 56.6 |
| Dry extract in volume (%) | 35.7 | 35.8 |
| Pigments (% dry film volume) | 28.7 | 28.6 |
| Pigments (% paint weight) | 24.8 | 28.3 |
| Paint volume mass (g/cm3) | 1.24 | 1.3 |
| Grinding fineness | 6 | 6 |

The two formulations according to the invention and the 5 mentioned test pieces are applied in three layers on steel samples subjected to a SA3 type surface preparation according to the Swedish standard SIS 05 59 00 - 1967.

The total average thickness of the dry film is 240 micrometers. The results of the tests obtained with the paint formulation according to the invention compared

| CONSTITUENT DESIGNATION TEST | PARTS IN WEIGHT INVENTION | PARTS IN WEIGHT TEST PIECE (1) | PARTS IN WEIGHT TEST PIECE (2) | PARTS IN WEIGHT TEST PIECE (3) | PARTS IN WEIGHT TEST PIECE (4) | PARTS IN WEIGHT PIECE (5) |
|---|---|---|---|---|---|---|
| PIGMENTS | | | | | | |
| ZINC 8-HYDROXYQUINOLATE | 2.95 | — | — | — | — | — |
| TETRAHYDRIC ZINC PHOSPHATE | 11.75 | — | — | — | — | — |
| ZINC CHROMATE INSOLUBLE TYPE | — | 19.3 | — | — | — | — |
| CALCIUM BOROSILICATE | — | — | 13.94 | — | — | — |
| ZINC MOLYBDENATE | — | — | — | 27.13 | — | — |
| MODIFIED ALUMINIUM TRIPHOSPHATE | — | — | — | — | 16.62 | — |
| ZINC AND MOLYBDENUM BASIC PHOSPHATE | — | — | — | — | — | 19.84 |
| MICRONISED TALCUM | 2.5 | 2.5 | 2.5 | 2.5 | 2.5 | 2.5 |
| BLACK CARBON | 0.7 | 0.7 | 0.7 | 0.7 | 0.7 | 0.7 |
| SYNTHETIC RED IRON OXIDE | 5.8 | 5.8 | 5.8 | 5.8 | 5.8 | 5.8 |
| RESINS AND ADDITIVES | | | | | | |
| 10 CPS CHLORINATED RUBBER RESIN | 13.1 | 13.1 | 13.1 | 13.1 | 13.1 | 13.1 |
| CHLORINATED PARAFFIN AT 42% OF CHLORINE | 5.8 | 5.8 | 5.8 | 5.8 | 5.8 | 5.8 |
| CHLORINATED PARAFFIN AT 70% OF CHLORINE | 8.0 | 8.0 | 8.0 | 8.0 | 8.0 | 8.0 |
| THIXOTROPING AGENT | 1.4 | 1.4 | 1.4 | 1.4 | 1.4 | 1.4 |
| SOLVENTS AND DILUENTS | | | | | | |
| ETHOXYPROPANOL ACETATE | 8.5 | — | 8.5 | 8.5 | 8.5 | 8.5 |
| ETHYLENE GLYCOL ACETATE | — | 8.5 | — | — | — | — |
| XYLENE | 34.9 | 34.9 | 34.9 | 34.9 | 34.9 | 34.9 |
| TOTAL | 95.4 | 100.0 | 94.64 | 107.83 | 97.32 | 100.54 | to those obtained with the 5 test formulations are summarized in the hereafter table.

| COMPARATIVE RESULTS REALIZED DESIGNATION | PROTOCOLS OR REFERENCE STANDARDS | RESULTS Invention compared to test piece (1) | RESULTS Invention compared to test piece (2) | RESULTS Invention compared to test piece (3) | RESULTS Invention compared to test piece (4) | RESULTS Invention compared to test piece (5) |
|---|---|---|---|---|---|---|
| Salt spray accelerated corrosion test (1160 hours) | Protocol DPCM n° 1051/ CERTSM/87 | + | + | ++ | ++ | ++ |
| Exposure to wet heat - 6 weeks | G621-P10-4 312/1 | ++ | ++ | + | ++ | + |
| Adherence by grid before exposure to salt spray | AFNOR NFT 30038 | (=) | (=) | (=) | (=) | (=) |

-continued

| COMPARATIVE RESULTS REALIZED DESIGNATION | PROTOCOLS OR REFERENCE STANDARDS | RESULTS Invention compared to test piece (1) | RESULTS Invention compared to test piece (2) | RESULTS Invention compared to test piece (3) | RESULTS Invention compared to test piece (4) | RESULTS Invention compared to test piece (5) |
|---|---|---|---|---|---|---|
| Adherence by grid after exposure to salt spray | AFNOR NFT 30038 | ++ | + | + | ++ | ++ |
| Impact test by mass drop (before salt spray) | AFNOR NFT 30030 | (=) | (=) | (=) | (=) | (=) |
| Impact test by mass drop (after salt spray) | AFNOR NFT 30030 | (=) | (=) | + | (=) | (=) |
| Tear out adhesive test (before salt spray) | AFNOR NFT 30062 | -- | - | -- | - | - |
| Tear out adhesive test (after salt spray) | AFNOR NFT 30062 | - | ++ | ++ | ++ | - |
| Adhesive test under high pressure water jet - 180 bars (before salt spray) | Protocol DPCM CERTSM | ++ | ++ | + | + | ++ |
| Adhesive test under high pressure water jet 180 bars (after salt spray) | Protocol DPCM CERTSM | ++ | + | ++ | ++ | + |
| Storage stability in warehouse - 1 year (evolution of viscosity) | Periodic measurements of viscosity KREBS-STORMER | (=) | + | - | (=) | + |
| Exposure test to sea spray (1 year) | Sea spray exposure panel located at PIPAOY mole (Toulon harbour) | (=) | (=) | ++ | ++ | ++ |

KEY
- = behaviour slightly lower than the test piece behaviour
(=) = similar to the test piece behaviour
+ = slightly higher than the test piece behaviour
++ = much higher than the test piece behaviour

EXAMPLE 6

A primary paint formulation reactive to polyvinylic butyral containing pigments according to the invention is prepared and compared to a zinc chromate test paint. The constituents of the two paint formulations are shown in the hereafter table.

| CONSTITUENT DESIGNATION | PARTS IN WEIGHT (INVENTION) | | PARTS IN WEIGHT (TEST PIECE) | |
|---|---|---|---|---|
| | ELEMENT A | ELEMENT B | ELEMENT A | ELEMENT B |
| PIGMENTS AND FILLING MATERIAL | | | | |
| ZINC 8 HYDROXY-QUINOLATE | 1.00 | — | — | — |
| TETRAHYDRIC ZINC PHOSPHATE | 6.70 | — | — | — |
| ZINC CHROMATE INSOLUBLE TYPE | — | — | 11.00 | — |
| BLUISH PHTHALOCYANINE GREEN | 0.20 | — | 0.10 | — |
| RUTILE DIOXIDE | 1.0 | — | 1.00 | — |
| MICRONISED TALCUM | — | — | 3.00 | — |
| RESINS SOFTENERS AND ADDITIVES | A | B | A | B |
| POLY-VINYLIC BUTYRAL | 11.70 | — | 9.00 | — |
| BENTONE 27 | 0.20 | — | 0.80 | — |
| "SPECIAL" TEXAPHOR (72% dry extract) | 1.80 | — | 0.90 | — |
| PHOSPHORIC ACID (85%) | — | 22.40 | — | 22.40 |
| SOLVENTS AND DILUENTS | A | B | A | B |
| NORMAL BUTANOL | 66.30 | 72.20 | 68.00 | 72.20 |
| 95% BUTYL ALCOHOL | 9.30 | 5.40 | 5.20 | 5.40 |
| DEMINERALIZED WATER | 1.80 | — | 1.00 | — |
| TOTAL | 100.00 | 100.00 | 100.00 | 100.00 |
| CORRESPONDING ANALYSIS IN WEIGHT | ELEMENT A: 100 g ELEMENT B: 25.1 g | | ELEMENT A: 100 g ELEMENT B: 19.3 g | |

These two formulations are applied on 500×500× mm steel sheets, pickled by projection of abrasive (sanding) to SA3 degree according to Swedish standard SIS 055900-1967.

The dry film average thickness is 10-15 micrometers. The exposure has been made on a panel tilted at 45 degrees in sea atmosphere, in winter (January-February 1990) during 5 weeks.

The results of the corrosion resistance tests are the following:

Formulation according to the invention: practically no corrosion is observed (it is lower than 5% of the surface)

Test formulation with zinc chromate: significant corrosion on approximately 50% of the surface from the first week of exposure.

I claim:

1. Anti-corrosive pigmentary composition for coating, characterized in that it contains zinc 8-hydroxyquinolate and at least one pigment.

2. Composition according to claim 1 characterized in that it contains at least one of the following pigments: zinc phosphate, iron phosphate, chromium phosphate, manganese phosphate, aluminum phosphate, aluminum oxide, calcium ferrite, zinc ferrite, magnesium ferrite, barium ferrite, iron ferrite, calcium borosilicate, barium borosilicate, calcium phosphosilicate, and barium phosphosilicate.

3. Pigmentary composition according to claim 2, characterized in that it comprises a pigment pulverulent mixture including, in combination, the percentages being expressed in comparison to the total weight of the pigment mixture:

a) 0.5-99.5% by weight of zinc 8-hydroxyquinolate, b) 0.5-99.5% by weight of at least one of the following pigments: zinc phosphate, iron phosphate, chromium phosphate, manganese phosphate, aluminum phosphate, aluminum oxide, calcium ferrite, zinc ferrite, magnesium ferrite, barium ferrite, iron ferrite, calcium borosilicate, barium borosilicate, calcium phosphosilicate, and barium phosphosilicate.

4. Composition according to claim 3, characterized in that it contains 5-15% by weight of component a and 30-60% by weight of component b.

5. Composition according to claim 4, characterized in that component b is a zinc phosphate.

6. Composition according to claim 5, characterized in that the component b is zinc tetrahydric diphosphate, $Zn_3(PO_4), 4H_2O$.

7. Composition according to claim 6, characterized in that it contains 5-15% by weight of zinc 8-hydroxyquinolate and 30-60% by weight of zinc tetrahydric diphosphate.

8. Paint characterized in that it contains an anti-corrosive pigmentary composition according to claim 1.

9. Paint according to claim 8, characterized in that it contains binders in aqueous dispersion or in solution in an organic, solvent.

10. Paint according to claim 9, characterized in that the binders are selected among acrylic polymeric compounds, vinyl, alkyde resins, epoxy resins, polyurethanes, chlorinated rubber, and polyvinyl butyral.

* * * * *